Figure 5:
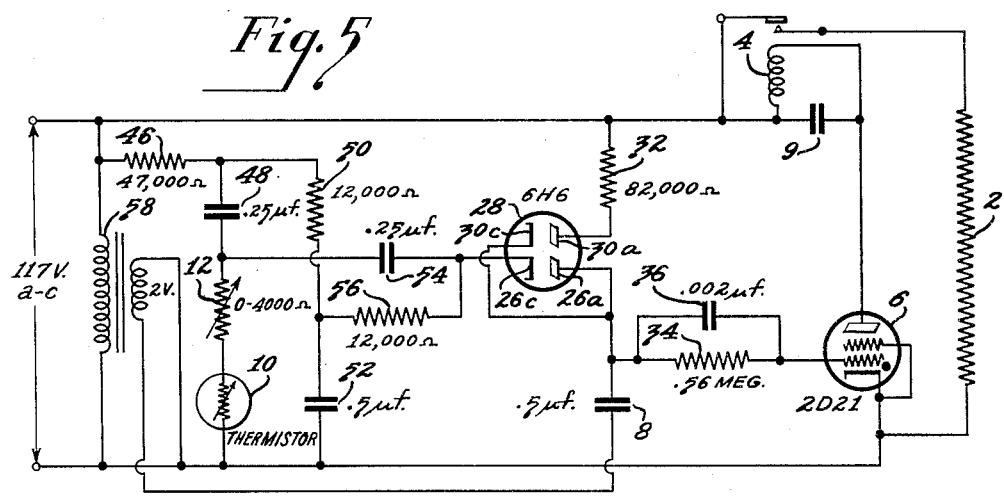

Aug. 8, 1950  R. A. YORK ET AL  2,518,108
TEMPERATURE SENSITIVE CONTROL FOR ELECTRIC BLANKETS
Filed June 21, 1947  2 Sheets-Sheet 1
*Fig. 1*
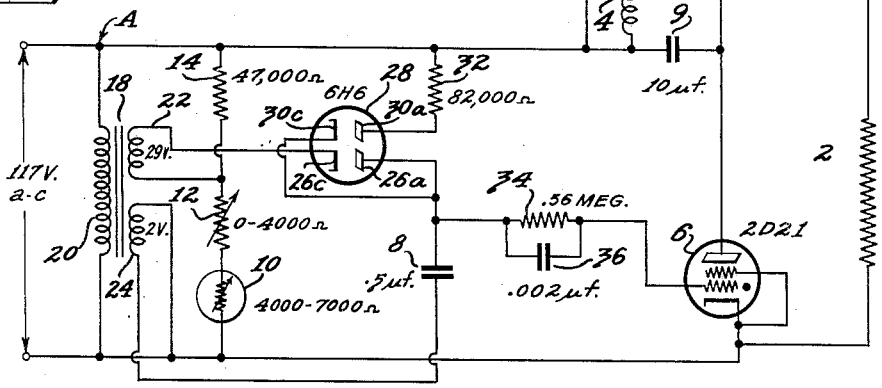
*Fig. 2*
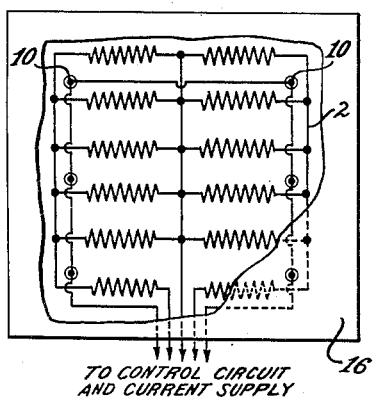
*Fig. 3*
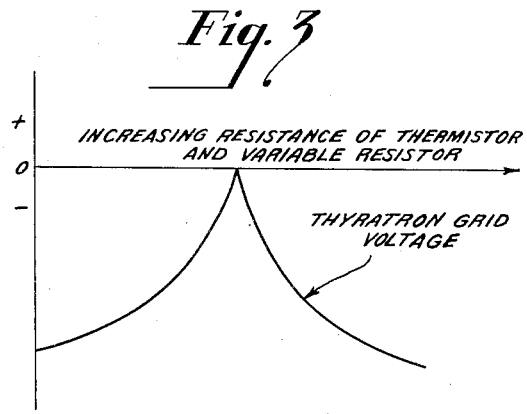
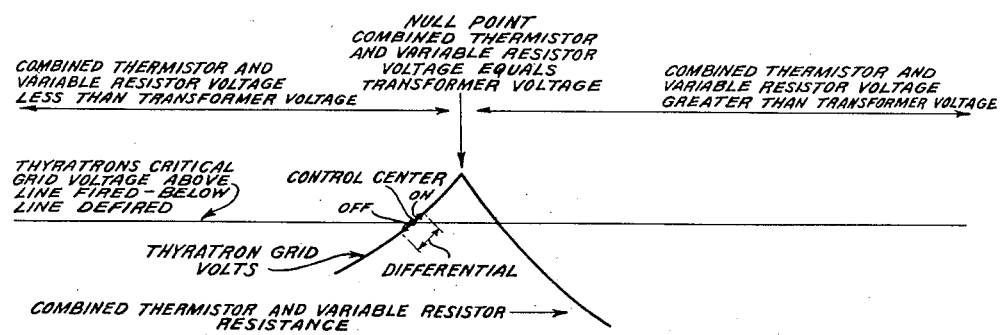
*Fig. 4*
INVENTOR.
Raymond A. York
& Harry J. Woll
BY
*J. Huff*
ATTORNEY.

INVENTOR.
Raymond A. York
& Harry J. Woll

Patented Aug. 8, 1950

2,518,108

UNITED STATES PATENT OFFICE 2,518,108

TEMPERATURE SENSITIVE CONTROL FOR ELECTRIC BLANKETS

Raymond A. York, Pitman, and Harry J. Woll, Audubon, N. J., assignors to Radio Corporation of America, a corporation of Delaware Application June 21, 1947, Serial No. 756,138

5 Claims. (Cl. 219—46)

This invention relates to improvements in temperature-sensitive control circuits and, more particularly, to improvements in fail-safe apparatus which may be used for switching an electric heating current on and off in response to information supplied by a temperature-sensitive device which preferably has a high negative temperature coefficient of resistance.

Heating devices for many purposes and having various types of thermostatic control elements to prevent overheating are well known in the art. Thermostats have been developed which will open and close an electric circuit when they are subjected to quite narrow variations in temperature. Coupled with these have been means for preventing damage to equipment when various parts of the apparatus failed mechanically. One type of apparatus having more than usually strict requirements in this respect has been the electric heating pad or blanket since it is necessary that this article be as free as possible from defects which would introduce a fire hazard or subject the user to too much heat.

Electrically heated pads and blankets in use at present may be classified according to their heating controls as falling under two general types. The first is that type which has a temperature-sensitive element which responds to changes in the temperature of the ambient atmosphere. This type generally has a thermostat and a small piece of resistance wire enclosed in a protective box having openings therein. This box is placed in the room in which the article is used. The thermostat is set to respond at some desired temperature and when the ambient temperature drops to this point the heating circuit is turned on. Current is supplied simultaneously to both the resistance wire in the box and the heating circuit in the blanket. When the resistance wire in the control box has raised the temperature of the air around the thermostat a predetermined amount, a set of contacts is opened and the current shuts off automatically. When the temperature within the box drops down sufficiently low, the contacts are closed and heating current is again supplied. While simple in operation, this type of control has several undesirable features. Sudden drafts may cause false responses and discomfort to the user. Also, no provision is made for accommodating more than one person under the same blanket except numerous trials made by the user until he finds the proper setting required to remain comfortable. It is also apparent that some further provision must be made to prevent excessive heating should the thermostat contacts stick in the closed position. In practice, it has been found necessary to include several more thermostats of rather bulky construction placed at various points in the heating circuit of the blanket to cut off the current when excessive temperatures are reached. When operation of the heat control unit is faulty these may "chatter" and upon them is thrown the entire responsibility for safeguarding against the effects of undue amounts of heat until the failure is noted and steps taken to correct it.

Another general type of heating blanket or pad is that having a temperature-sensitive device embedded in the web of the article. The most satisfactory of these have utilized wires having a positive temperature coefficient of resistance as one arm of a bridge circuit and a high gain vacuum tube amplifier for switching current on and off in the heater circuit in response to resistance changes in the heat sensitive material. While these are, in general, more stable in their operation than the type previously described, their safety features have not been such as to receive unqualified approval. Moreover, they have sometimes used vacuum tube fuses to protect against the effects of sticking relays and these tubes are expensive to replace when blown out. In addition to the unsatisfactory safety features, another undesirable characteristic has been the fairly low degree of sensitivity of the temperature-sensitive medium which they have utilized.

One object of the present invention is to provide an improved fail-safe circuit for controlling either a mechanical or electrical operation in response to a varying resistance.

Another object of the present invention is to provide an improved fail-safe circuit for controlling a switching means in response to changes in the resistance of an element having a high temperature coefficient of resistance.

Another object of the present invention is to provide an improved fail-safe circuit for controlling a switching means in response to changes in the temperature of an element which has a high temperature coefficient of resistance.

Another object of the present invention is to provide an improved control circuit for a heating unit which is responsive to changes in the temperature of the unit.

Another object of the invention is to provide an improved control circuit employing a temperature-sensitive element for a heating unit which will fail safe as the result of occurrence of either short or open circuits in the temperature-sensitive element.

Another object of the invention is to provide an improved control circuit for a heating unit which utilizes a temperature-sensing device which has a high degree of sensitivity.

Another object of the invention is to provide an improved control circuit for a heating unit which may utilize an element having either a negative or a positive temperature coefficient of resistance as the temperature-sensitive element.

Figure 6:
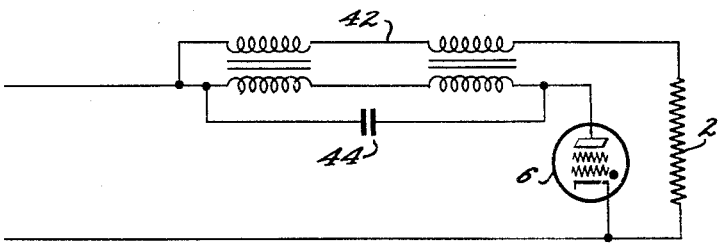
Figure 7:
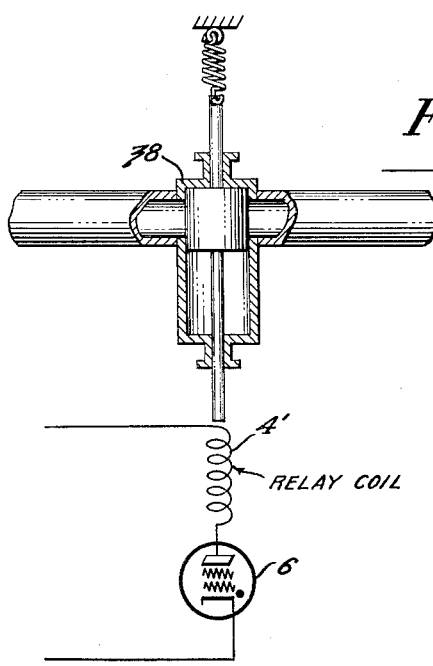

These and other objects will be more apparent and the invention will be better understood by reference to the following specification and to the accompanying drawings wherein:

Fig. 1 is a circuit diagram of a preferred embodiment of the invention,

Fig. 2 is a detail view of a part of the circuit of Fig. 1 illustrating one form of relationship between the heating element and the temperature-sensitive element, Fig. 3 is a graph of thyratron grid voltage versus thermistor resistance as applied to the thyratron tube shown in the circuit of Fig. 1 with certain circuit elements omitted, Fig. 4 is a graph showing the effect on the voltage curve of Fig. 3 produced by an added D.-C. voltage, Fig. 5 is an alternative circuit which may be substituted for the circuit shown in Fig. 1, Fig. 6 is a detail view of part of the circuits of either Figs. 1 or 5 showing an alternative type of switching device, and Fig. 7 is another detail view illustrating an alternative type of control operation which may be carried out with the aid of the circuits shown in either Figs. 1 or 5.

As shown in Fig. 1, a heating unit 2 is supplied with current from the A.-C. power lines. A relay 4 with a capacitor 9 in shunt therewith and having contacts in series with the heating unit 2 and with the A.-C. lines serves as a switching device to turn the current flow on and off through the resistance wire of the heating unit. Control of current through the coil winding of the relay 4 is accomplished by placing a gas-filled thyratron tube 6, which may be a type 2D21, in series with the relay winding and the A.-C. lines. When the thyratron tube 6 is conducting current, the relay contacts are closed and current flows in the wires of the heating unit. During extended periods when the thyratron tube is not conducting, the relay contacts are open and no current flows in the heating unit. This does not mean, however, that the relay contacts open during each half cycle when the filament of the thyratron is positive and its plate negative. The relay's moving parts have considerable inertia and the capacitor 9, which is connected across the relay coil, holds a charge during the negative half cycles which also tends to keep the relay contacts closed.

The improvements constituting the present invention have been designed to automatically maintain the temperature of the heating unit at a predetermined value in accordance with the desires of the operator and to cut off all current flow in the heating unit if the resistance of the sensing device should travel either way outside a certain specified range.

As further shown in Fig. 1, there are placed in series across the A.-C. power lines a thermistor 10 having a high negative temperature coefficient of resistance, a variable resistor 12, and a fixed resistor 14 which, together, operate as a potential divider. The thermistor 10 is placed advantageously within the medium 16, the temperature of which it is desired to control by the heat of the heating unit 2. This is shown more particularly in Fig. 2.

Referring again to Fig. 1, a transformer 18 has its primary winding 20 connected across the A.-C. supply lines and has two secondary windings 22 and 24 wound in opposed relation to each other. One side of the secondary winding 22 is connected to one of the cathodes 26c of a double diode vacuum tube 28 and the other side is connected between the variable resistor 12 and the fixed resistor 14. The anode 26a of the same half of the double diode tube 28 is connected in series with a capacitor 8, the other secondary winding 24 of the transformer 18, and the end of the thermistor 10 opposite the end which is connected to the variable resistor 12. There is thus formed a series circuit consisting of the windings 22 and 24 of the transformer, one-half of the double diode 28, the capacitor 8, the thermistor 10 and the variable resistor 12. The secondary winding 22 thus provides a voltage in opposition to that normally imposed across the thermistor 10 and variable resistor 12 in consequence of their being connected across the A.-C. power lines. The fixed resistor 14 supplies a certain fixed current to the thermistor and variable resistor.

The other half of the double diode tube has its cathode 30c connected to the first anode 26a and its anode 30a connected to one side of the A.-C. supply through a resistor 32.

The control grid of the thyratron tube 6 is connected through a circuit comprising a resistor 34 and capacitor 36 in parallel to a point between the capacitor 8 and the anode 26a of the double diode vacuum tube.

The general operation of the above described control circuit is such that the control unit may be set to cause current to flow through the switching device when the resistance across the thermistor reaches or exceeds some selected value within a predetermined range of resistance but will maintain the switching device in an "off" condition when the resistance of the thermistor is outside the predetermined range either above or below. This is one of the novel characteristics of the present invention and the means for accomplishing it will be more specifically described later. Since the thermistor is supplied with a substantially constant current, the potential across it varies only with its temperature. Thus, the switching device may be turned on when the temperature of the thermistor reaches or exceeds a certain selected value within a predetermined range and will not turn on when the temperature is outside the limits of that range. If the switching device is being used to connect to a current source a heating element which is supplying heat to a body in which there is located the thermistor in heat transfer relation to the heating element, the temperature of the body may be controlled within the predetermined range by the setting of the control unit.

Another significant feature of the invention resides in the utilization in a thermostatic control of a substance having a resistance which has relatively high temperature sensitivity, and the fact that it has been adapted to the present purpose, even though it has a negative temperature coefficient of resistance. Examples of substancess suitable for the purpose are silver sulphide and boron. The problem in adapting a material having a negative temperature coefficient to a heating device which must be safe against mechanical failures, not only for short circuits but for open circuits, lies in the fact that if an open circuit occurs in the thermistor circuit the condition normally calls for more current to be supplied to the heating element instead of being turned off as safety requires. However, in the control circuit of the present invention, a more than normal increase in resistance, such as an "open" or break in the thermistor circuit, results in the thyratron not being able to fire and hence no closing of the relay contacts and no current flowing in the heating element.

More specifically, the operation of the control circuit is as follows:

The variable resistor 12 is first selected to provide for operation within a certain desired range of temperature, say 70°–110° F. In the example shown in Fig. 1, the value of this resistor may be varied between 0 and 4000 ohms. This resistance may be calibrated so that the scale presented to the user reads in degrees of temperature. The user sets the dial for the temperature at which he wishes to use the heater and switches on the A.-C. line current. The thermistor 10 which is embedded in the medium which is to be heated, as say a blanket, has a resistance which depends on its temperature. In the practical example chosen and for the circuits as shown, this element has a resistance of about 7000 ohms at 70° F. and 3000 ohms at 110° F.

Referring now to Fig. 4, when the combined resistance of the thermistor 10 and variable resistor 12 is sufficiently high, the current conducted by the lower or control half of the double diode will be small, the consequent negative charge on the capacitor 8 will be lowered and the potential of the control grid of thyratron 6 will rise above its critical value, as indicated by the reference line, which results in the thyratron firing and current being supplied to the heating unit because of closure of the contacts of relay 4. For example, circuit values may be chosen such that the thyratron fires when the combined resistance of the thermistor and variable resistor equals 7000 ohms. If the variable resistor is set at its lowest value; i. e., zero ohms, the resistance of the thermistor will have to be at its maximum (7000 ohms) in order to cause the thyratron to fire. This condition occurs when the temperature of the thermistor is 70° F. If the temperature of the thermistor is higher than 70° F., its resistance will be lower than 7000 ohms and the total resistance of thermistor and variable resistor will therefore be too low to cause the thyratron to fire. As the variable resistor is set for increasing values of resistance the resistance needed to be contributed by the thermistor is less, or, in other words, its temperature may be higher with the thyratron still in condition to fire.

The curve of Fig. 4 shows the relationship between the combined resistance of the thermistor and variable resistor and the firing of the thyratron. With the variable resistor set at a predetermined value, the combined resistance increases only as the resistance of the thermistor increases, that is, as its temperature decreases. The thyratron control grid voltage rises, meanwhile, until it exceeds the critical value at which the tube fires. All points on the curve of thyratron control grid voltage above the reference line represent values sufficiently high to cause the gas tube to conduct. The operating point when using a thermistor having a negative temperature coefficient of resistance is, as shown in Figure 4, at that point where the rising value of thyratron control grid voltage crosses the reference line or critical potential. A change in temperature of no more than a degree either way will cause the resistance of the thermistor to change sufficiently to either fire or de-fire the thyratron as the case may be.

All points on the curve of thyratron grid voltage from the low point of thermistor resistance up to the peak of the curve also represent points for which the sum of the voltages across the thermistor and the variable resistor 12 is less than the resultant of the voltages across the transformer secondaries. The peak of the grid voltage curve is a null point at which the sum of the resistor and thermistor voltages and the transformer voltage are equal. All points on the grid voltage curve beyond the peak represent points at which the transformer voltage is exceeded by the resistor and thermistor voltages.

When the combined potential across the variable resistor 12 and thermistor 10 just equals the resultant voltage across the transformer secondaries, almost no current flows in the lower half of the diode. The upper half of the diode charges the capacitor 8 with a sufficiently high positive potential to provide the thyratron grid with a maximum positive potential and thus keep it conductive. On either side of the peak, the lower half of the diode is conducting current and the more current this half conducts the less positive is the charge on capacitor 8 and on the control grid of the thyratron until finally the potential drops below the critical or firing potential.

Due principally to the presence of resistor 14, the thermistor is fed with a substantially constant current from the A.-C. supply and the voltage across it is directly proportional to its resistance. In series with this first voltage across the thermistor is one of opposite polarity derived from the secondary windings 22 and 24 of transformer 18. These secondary windings are, first of all, wound so that their voltages oppose each other and the voltage which they superimpose on the thermistor is actually the difference between the two. This resultant voltage is, in turn, opposed to the voltage across the thermistor derived directly from the A.-C. supply. When this voltage is rectified by the lower half of the double diode 28 there is obtained a D.-C. voltage which varies with the resistance of the thermistor, when the variable resistor is set at a constant value, as shown in Fig. 3.

The upper half of the double diode 28 also rectifies the alternating current from the line, and the resistor 32 in series with the anode of the upper half of the diode causes a positive D.-C. voltage to be added to that obtained from the lower half and this added voltage is such as to lower the reference point and allow the thyratron to fire whenever the resistance of the thermistor exceeds the set value, provided it does not exceed it too much, as in an open circuit. Fig. 4 illustrates this.

When the temperature of the thermistor exceeds the value for which the variable resistor 12 has been set, its resistance will have fallen to a value such that the potential across the lower half of the diode rises and the upper plate of the capacitor 8 is sufficiently negative that the thyratron is prevented from conducting by the corresponding negative potential on its control grid.

One of the safety features of the above circuit is that if the thermistor should fail by open circuit, a high negative charge is placed on capacitor 8 during the first subsequent half cycle when point A is negative and this prevents conduction of the tube during the next half cycle when point A is positive.

The transformer secondary winding 24 also has a protective function in the circuit. It supplies a sufficient A.-C. bias to the grid of the thyratron, the grid being negative when the plate is positive, to prevent the thyratron from firing if the double diode tube 28 should fail. The presence of this bias also prevents the thyratron from drawing anode current until its cathode has had time to warm up.

A capacitor 36 may be placed in parallel with grid resistor 34 to prevent the grid from causing the thyratron to fire too soon. Due to the diode action of the thyratron grid, when the grid is positive with respect to the cathode, this capacitor 36 prevents the thyratron from firing during the part of the 60 cycle wave when the grid bias is approximately zero. This function is used only when the double diode is inoperative.

Grid resistor 34 is included so that the thyratron does not load the circuit too heavily and also to regulate the current drawn by the grid of the thyratron.

Although the circuit has been described in connection with use of a thermistor having a negative temperature coefficient of resistance, it is obviously also operative when a material having a positive coefficient is used. The operating point of the thyratron will then be on the down slope of the curve at the critical potential.

The circuit is, furthermore, not limited to use in controlling an electric heating current but may be used as well for controlling the flow of other heating media. Examples are fluids such as hot water and gases such as hot air or steam. As shown in Fig. 7, the relay 4' may operate a valve 38 or any other form of control for starting and stopping a mechanical or electrical operation. The operation which is being controlled may be entirely separate from the medium to which the temperature sensitive resistor is responsive. For example, the resistor may be in a furnace wall and the switching device may be placed at a distance opening a valve for admitting material to the furnace or operating a warning light or a recording device.

As an alternative to using a relay as a means for switching line current on and off in the heating unit 2, a saturable reactor 42 may be used as shown in Fig. 6. In this modification, a reactor 42, having two windings wound in opposed relationship and having a capacitor 44 connected across the primary windings, is substituted for the relay 4. When the thyratron tube 6 is not conducting, the current through the circuit containing the heating element 2 and the transformer primaries is normally limited by the high inductance of the transformer. But when the tube is conducting, the direct current in the secondary lowers the inductance in the primary windings so that current in the heater circuit is no longer limited to the same extent.

Another form of control circuit which may be used in the present invention is illustrated in Fig. 5. This circuit is a form of parallel-T network and results in the same type of peaked thyratron grid voltage curve, with relation to the resistance of the thermistor, as shown in Fig. 4. In the modification, two branches of a parallel circuit are connected across the A.-C. mains, one end being connected to the line through a resistor 46. One branch of the circuit consists of a capacitor 48, the variable resistor 12 and thermistor 10. The other branch, in parallel, consists of a resistor 50 and capacitor 52. Each of these branches is connected in parallel to the lower cathode 26c of double diode tube 28, the first branch being connected to the cathode between the capacitor 48 and variable resistor 12 through a capacitor 54 and the second branch being connected between resistor 50 and capacitor 52 through a resistor 56.

The line transformer 58 has but a single secondary winding from which a 2 v. bias is tapped to apply a bias to the control grid of the thyratron 6. As in the case of the circuit shown in Fig. 1, this bias prevents the thyratron from firing when the double diode is not conducting.

The operation of this circuit is substantially the same as that shown in Fig. 1. The curve of thyratron control grid voltage as related to the combined resistance of thermistor 10 and variable resistor 12 is exactly the same as that shown in Fig. 4. This circuit also has protective features for either "shorts" or "opens" in the thermistor circuit. When the former fault occurs, the high resistance path through the resistors 46, 50, and 56 results in the thyratron control grid voltage dropping below its critical value. Should an open circuit occur, the path through the capacitors 48 and 54 is utilized to maintain a high negative potential on the thyratron control grid during that portion of each cycle when the cathode of the gas tube 6 is negative and the plate positive.

There has thus been described an improved circuit for controlling either a mechanical or an electrical operation in response to changes in the resistance of a control element. The resistance of the control element preferably is sensitive to temperature changes and the operation which is controlled may be one which supplies heat to a medium with which the temperature sensitive element is associated.

We claim as our invention:

1. An apparatus comprising a source of A.-C. current, current switching means connected to said source through the anode-cathode path of a grid controlled electron discharge device, means controlling the potential of said grid, said controlling means including a temperature responsive resistor in heat transfer relation to a medium adapted to be heated, means applying a first A.-C. potential across said resistor, said first potential being variable in response to the temperature of said resistor, means applying in series with said first potential a second A.-C. potential of predetermined value and opposite in sign to said first A.-C. potential, means rectifying the potential which is the resultant of said first and second A.-C. potentials, means applying said resultant potential to said grid such that said grid is negative, means applying an additional positive D.-C. potential to said grid in opposition to said rectified resultant potential, said additional potential being sufficiently high to maintain said discharge device conductive when said first A.-C. potential is within a predetermined range of numerical values above and below that of said second A.-C. potential, and also being sufficiently low to permit the lowering of the potential on said grid below a value necessary to maintain said discharge device conductive when said first A.-C. potential is outside said range.

2. Apparatus according to claim 1 and including means for applying an additional A.-C. biasing potential to said grid of said discharge device, such that said grid is negative when the anode of said device is positive upon said rectifying means being rendered inoperative.

3. Apparatus according to claim 1 in which said temperature responsive resistor has a negative temperature coefficient of resistance.

4. Apparatus according to claim 1 in which said current switching means is a saturable reactor.

5. Apparatus according to claim 1, including said medium adapted to be heated, and in which said medium is a blanket having a heating means associated therewith, said heating means being connected to a source of current through said current switching means.

RAYMOND A. YORK.
HARRY J. WOLL.

REFERENCES CITED

The following references are of record in the file of this patent:

UNITED STATES PATENTS

| Number | Name | Date |
|---|---|---|
| 1,694,264 | Hull | Dec. 4, 1928 |
| 2,086,966 | Shrader | July 13, 1937 |
| 2,189,462 | Donle et al. | Feb. 6, 1940 |
| 2,193,578 | Bruce | Mar. 12, 1940 |
| 2,266,569 | Schneider et al. | Dec. 16, 1941 |
| 2,278,633 | Bagnall | Apr. 7, 1942 |
| 2,349,849 | Deal | May 30, 1944 |
| 2,429,453 | Crowley | Oct. 21, 1947 |